No. 761,796. PATENTED JUNE 7, 1904.
A. TUTTLE.
AUTOMATIC RELEASING DEVICE FOR NOOSED CABLES.
APPLICATION FILED DEC. 22, 1903.
NO MODEL.
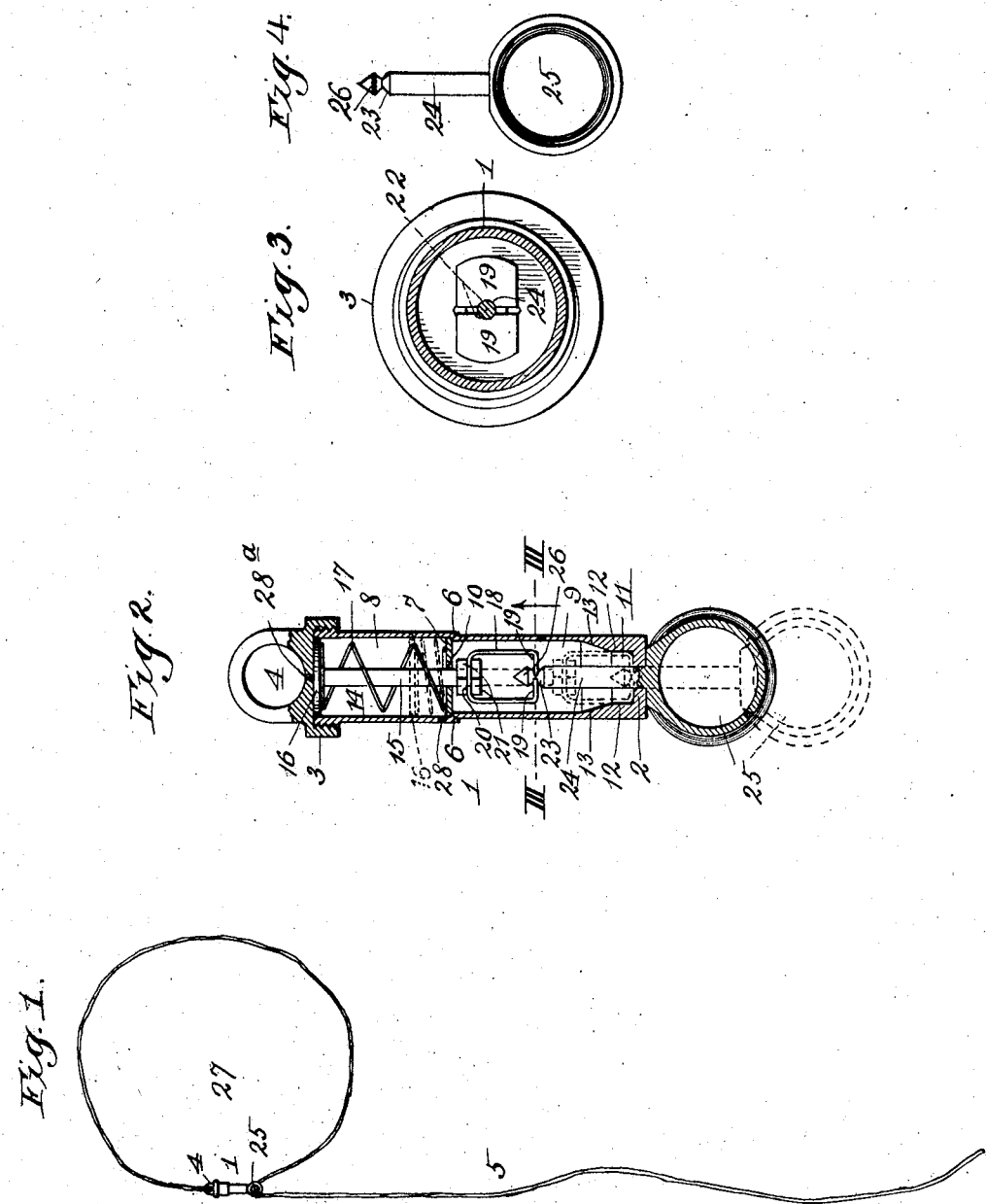

No. 761,796. Patented June 7, 1904.

UNITED STATES PATENT OFFICE.

ARTHUR TUTTLE, OF CHANUTE, KANSAS.

AUTOMATIC RELEASING DEVICE FOR NOOSED CABLES.

SPECIFICATION forming part of Letters Patent No. 761,796, dated June 7, 1904.

Application filed December 22, 1903. Serial No. 186,256. (No model.)

*To all whom it may concern:*

Be it known that I, ARTHUR TUTTLE, a citizen of the United States, residing at Chanute, in the county of Neosha and State of Kansas, have invented certain new and useful Improvements in Automatic Releasing Devices for Noosed Cables, of which the following is a specification.

My invention relates to an automatic releasing device for noosed cables; and my object is to provide a simple device for attachment to one end of a cable, whereby a noose formed at said end may be reliably held intact or quickly released at the will of the operator.

The device is provided with two separable members, one of which is permanently attached to one end of the cable, while the other has an eye through which the cable is rove to form a noose, and said members are so connected that a steady pull thereon will securely lock them together, but when subjected to a sudden jerk will pull apart, thus disconnecting the noose and releasing the object which it embraced.

While the device may be used to advantage on cables employed for various purposes, it is especially adaptable for forming and disconnecting a noose at the end of a lasso, as by its use a cowboy is enabled to rope, throw a steer, and release the latter without dismounting from his horse.

In order that the invention may be fully understood, reference will now be made to the accompanying drawings, in which—

Figure 1 shows the device attached to the noosed end of a cable. Fig. 2 is a central longitudinal section of the device. Fig. 3 is a transverse section thereof taken on line III III of Fig. 2. Fig. 4 is a detail view of the plunger forming part of the invention.

In carrying out the invention I employ a tubing 1, closed at one end by an integral head 2 and at its opposite end by a screw-cap 3, provided with an eye 4, to which one end of cable 5 is permanently attached. Tube 1 is provided with an interior shoulder 6, arranged about midway between its opposite ends for the reception of a transverse partition 7, dividing the tube into two chambers 8 and 9, and provided with a central aperture 10 for a purpose hereinafter described. The permanently-closed end of the tubing is provided with a seat 11, formed by parallel walls 12 and the integral head 2, and the upper end of walls 12 communicate with inclined walls 13, which latter communicate at their opposite ends with the enlarged inner surface of chamber 9.

14 designates a piston consisting of a stem 15, reciprocably arranged in aperture 10 and provided at its upper end with a piston-head 16, normally held in contact with the under side of screw-cap 3 by an expansion-spring 17, interposed between said piston-head and partition 7. The piston-head fits comparatively loose within chamber 8, so that it will not frictionally contact with the walls of the chamber when reciprocated in the latter.

18 designates a spring member consisting of oppositely-disposed gripping-jaws 19, united at their upper ends by a transverse portion 20, secured to the lower terminal of stem 15 by locking-nuts 21. The inwardly-projecting ends of the gripping-jaws have segmental recesses 22 for embracing a peripheral groove 23 in the upper end of a plunger-stem 24, which latter projects through a central aperture in head 2 and is provided at its outer end with an eye 25, preferably larger than eye 4, in order that cable 5 may easily slide therein. The inner end of stem 24 is provided with a conical head 26, so that it can be readily forced between or withdrawn from the gripping-jaws.

In practice the plunger is pushed inwardly until its grooved portion 23 is engaged by the gripping-jaws. The free end of cable 5 is then passed through eye 25 to form a noose 27. After the noose has been placed or thrown over an object it may be drawn tightly around the latter by pulling steadily on cable 5, which operation pulls the plunger outwardly and seats the jaws between parallel walls 12, so that it will be impossible for the jaws to expand and release the plunger, regardless of the strain brought to bear thereon.

As the gripping-jaws are more rigid than spring 17 they will overcome the pressure of said spring as they move outwardly with the plunger, and thus draw the piston therewith, causing it to expel the air from chamber 8 through a small outlet 28, communicating with the chamber just above the partition.

So long as the strain on the cable is sufficient to hold the jaws in seat 13 it will be impossible to disconnect them from the plunger; but by allowing the cable to slack sufficiently to permit spring 17 to return the piston to its normal position and then giving the cable a sudden jerk the resistance of spring 17 and the air in chamber 8 will overcome the compressive force of the gripping-jaws and disconnect them from the plunger, so the latter will be withdrawn from the tubing and of course disconnect noose 27, so it will release the object which it embraced.

The diameter of seat 11 is such as to permit the jaws to readily enter therein or leave the same without frictional contact with walls 12, so spring 17 may quickly withdraw them from between said walls immediately upon the slacking of the cable. I also provide cap 3 with a vent 28ª, so the air in chamber 8 will not retard the return of piston 14 to its normal position.

As the gripping-jaws move outwardly with the plunger they will be guided to seat 11 by the inclined walls 13.

While I have shown and described the preferred form of my device, it is apparent that such changes as will properly fall within the scope of the appended claims can be made.

Having thus described my invention, what I claim, and desire to secure by Letters Patent, is—

1. An automatic releasing device for noosed cables consisting of a tubing closed at its opposite ends, a piston reciprocably arranged therein, gripping-jaws secured to one end of the piston, and a plunger adapted to be engaged and automatically released from the gripping-jaws and the tubing.

2. An automatic releasing device for noosed cables consisting of a tubing closed at its opposite ends and adapted to be secured at one end to a cable, a piston reciprocably arranged therein, gripping-jaws secured to one end of the piston, and a plunger adapted to be engaged and automatically released from the gripping-jaws and the tubing and provided with an eye for the reception of the cable.

3. An automatic releasing device for noosed cables consisting of a tubing closed at its opposite ends, a piston reciprocably arranged therein, gripping-jaws secured to one end of the piston, a plunger adapted to be attached and detached from the gripping-jaws and the tubing, and means within the tubing adapted to rigidly lock the jaws into contact with the plunger when the latter is partly withdrawn from the tubing.

4. An automatic releasing device for noosed cables consisting of a tubing closed at its opposite ends, a piston reciprocably arranged therein, gripping-jaws secured to one end of the piston, a plunger adapted to be attached and detached from the gripping-jaws and the tubing, means within the tubing adapted to rigidly lock the jaws into contact with the plunger when the latter is partly withdrawn from the tubing, and a cable permanently secured to one end of the tubing and loosely secured to the plunger.

5. An automatic releasing device for noosed cables consisting of a tubing closed at its opposite ends and provided with an air-chamber, a piston reciprocably arranged in the air-chamber, gripping-jaws secured to one end of the piston, and a plunger adapted to be engaged and automatically released from the gripping-jaws and the tubing.

6. An automatic releasing device for noosed cables consisting of a tubing closed at its opposite ends, a piston reciprocably arranged in the tubing, gripping-jaws secured to one end of the piston, a plunger adapted to be engaged and automatically released from the gripping-jaws and the tubing, and a seat within the latter for rigidly locking the gripping-jaws into contact with the plunger.

7. An automatic releasing device for noosed cables consisting of a tubing closed at its opposite ends, a seat located within one end of the tubing, a piston reciprocably arranged in the tubing, gripping-jaws secured to one end of the piston, a plunger adapted to be engaged and automatically released from the gripping-jaws and the tubing, and inclined walls within the tubing communicating with the seat for the purpose of guiding the jaws into the latter.

8. An automatic releasing device for noosed cables consisting of a tubing closed at its opposite ends, a partition dividing the tubing into two chambers, a piston reciprocably arranged within the tubing and extending through the partition, gripping-jaws secured to one end of the piston, a plunger adapted to be engaged and automatically released from the gripping-jaws and the tubing, and a cable permanently secured to one end of the tubing and slidingly secured to one end of the plunger.

9. An automatic releasing device for noosed cables consisting of a tubing closed at one end by an integral head, a screw-cap for closing the opposite end of the tubing, a piston reciprocably arranged in the tubing, gripping-jaws secured to one end of the piston, and a plunger adapted to be engaged and automatically released from the gripping-jaws and the tubing.

10. An automatic releasing device for noosed cables consisting of a tubing closed at its opposite ends, a piston reciprocably arranged therein, spring-jaws secured to one end of the piston, a plunger, and an integral head formed on one end thereof adapted to be engaged and automatically released from the gripping-jaws and the tubing.

11. An automatic releasing device for noosed cables consisting of a tubing closed at its opposite ends, a piston reciprocably arranged therein, gripping-jaws secured to one end of the piston, a plunger provided at its inner end with a peripheral groove for engagement with the gripping-jaws and an eye at its outer end, a conical head formed integral with the inner end of the plunger, and a cable attached to one end of the tubing and slidingly secured in the eye of the plunger.

In testimony whereof I affix my signature in the presence of two witnesses.

ARTHUR TUTTLE.

Witnesses:
J. W. BOLING,
F. G. FISCHER.